(12) United States Patent
Sasaki et al.

(10) Patent No.: US 6,205,099 B1
(45) Date of Patent: Mar. 20, 2001

(54) DISK DEFECT MANAGEMENT METHOD AND DISK RECORDING AND REPRODUCING APPARATUS

(75) Inventors: Shinji Sasaki, Osaka; Hiroshi Ueda, Hirakata; Motoshi Ito; Yoshihisa Fukushima, both of Osaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/191,939

(22) Filed: Nov. 13, 1998

(30) Foreign Application Priority Data

Nov. 14, 1997  (JP) .................................................... 9-312988

(51) Int. Cl.[7] ...................................................... G11B 7/00
(52) U.S. Cl. .............................................................. 369/54
(58) Field of Search ................................. 369/32, 54, 58, 369/275.3

(56) References Cited

U.S. PATENT DOCUMENTS 5,257,248 * 10/1993 Ogasawara .............................. 369/58

OTHER PUBLICATIONS

Standard ECMA–272, pp. 43–55, 1998.

* cited by examiner

*Primary Examiner*—Nabil Hindi
(74) *Attorney, Agent, or Firm*—Renner, Otto, Boisselle & Sklar LLP

(57) ABSTRACT

A method for managing a defect of a disk is provided, the disk including a plurality of tracks, each of the plurality of tracks being divided into a plurality of sectors, the method including the steps of: detecting a defective sector which cannot be traced physically among the plurality of sectors; and registering the defective sector and at least one sector following the defective sector in a defect list as defective sectors.

6 Claims, 19 Drawing Sheets

```
              PDL
      ┌─────────────────┐
      │ PDL identifier  │
      ├─────────────────┤
      │Number of entries│
      ├─────────────────┤
      │     PDE 1       │
      ├─────────────────┤
      │     PDE 2       │
      ├─────────────────┤
      │     PDE 3       │
      ├─────────────────┤
      │       ⋮         │
      ├─────────────────┤
      │     PDE n       │
      └─────────────────┘
```

Slipping Algorithm

Linear Replacement Algorithm

FIG.15A

Sector No. →

Track No. 00 01 02 03 04 05 06 07

0010

0011     SD1

0012                                                          Defective sector

PDL    Defective sector address

| PDE1 | 0011 | 02 |
|------|------|----|

DISK DEFECT MANAGEMENT METHOD AND DISK RECORDING AND REPRODUCING APPARATUS

BACKGROUND OF THE INVENTION

1. Field of the Invention

The present invention relates to a recordable and reproducible disk having a sector structure and a disk recording and reproducing apparatus, and more specifically to a method for managing a defect of a disk susceptible to a scratch and an apparatus for recording information onto and reproducing information from the disk.

2. Description of the Related Art

A representative example of a disk having a sector structure includes an optical disk. In recent years, capacity of optical disks has been remarkably increased, and data has been recorded on an optical disk in high density. Therefore, it is important to ensure reliability when information is recorded onto an optical disk or when information is reproduced from an optical disk.

FIGS. 1A through 1C show a general physical and logical structure of a disk medium 1.

FIG. 1A is a schematic diagram of the disk medium 1. The disk medium 1 in a circular shape includes a plurality of concentrically formed tracks 2. Each track 2 is divided into a plurality of sectors 3 in a radius direction. A leading edge of each sector 3 is provided with an absolute address called a physical sector address. Herein, the "leading edge" refers to an edge of each sector 3 in a rotation direction in which the disk medium 1 is rotated.

FIG. 1B schematically shows a sector management method. Tracks are assigned numbers (0 to T). Sectors included in each track are assigned numbers (0 to S). Each sector can be accessed by specifying a track number and a sector number.

FIG. 1C shows a structure of areas of the disk medium 1 (FIG. 1A). The disk medium 1 (FIG. 1A) is composed of a disk information area 4 and a data recording area 5. The disk information area 4 is positioned on an innermost side and on an outermost side of the disk medium 1 (FIG. 1A). In the disk information area 4, parameters and the like required for accessing a disk are stored. The data recording area 5 is positioned between the disk information areas 4 on an innermost side and on an outermost side. In the data recording area 5, ordinary data such as video data and audio data is stored. For recording and reproducing data, a disk is initialized, and data is written onto the data recording area 5.

In recording of information onto and reproduction of information from an optical disk, the procedure described below is used for ensuring reliability. More specifically, in the case where there is a sector on a disk in which information cannot be recorded or reproduced, the sector is registered as a defective sector, and the use of the defective sector is prohibited. The procedure will be described in accordance with International Standardization Organization ISO/IEC10090.

In the case where a defect is found in a sector during recording and reproduction of data, the sector is registered as a defective sector in a Primary Defect List (hereinafter, referred to as a "PDL") and/or in a Secondary Defect List (hereinafter, referred to as an "SDL"). Herein, the "defect" refers to the case where there is a physical scratch in a sector in a track. A disk recording and reproducing apparatus does not use the defective sector registered in the PDL or the SDL in the subsequent recording and reproduction, thereby being capable of recording and reproducing data without accessing the defective sector. The PDL and the SDL are stored in the disk information area 4 in FIG. 1C.

FIG. 10A shows a structure of the PDL. The PDL is composed of a PDL identifier identifying the PDL, the number of entries showing the number of defective sectors registered in the PDL, and n entries (PDE1 to PDEn) storing addresses of actual defective sectors.

FIG. 10B shows a structure of the PDEn. The PDEn stores an address of a defective sector specified by a track number and a sector number. The PDE1 to PDE(n−1) also have the same structure as that of the PDEn.

FIG. 11A shows a structure of the SDL. In the same way as in the PDL, the SDL is composed of an SDL identifier identifying the SDL, the number of entries showing the number of defective sectors registered in the SDL, and m entries (SDE1 to SDEm) storing addresses of actual defective sectors.

FIG. 11B shows a structure of the SDEm. The SDEm stores a defective sector address and an alternative sector address thereof. The defective sector address and the alternative sector address are both specified by a track number and a sector number. The SDE1 to SDE(m−1) also have the same structure as that of the SDEm. The difference between the PDL and the SDL is that the SDL has an alternative sector address.

Next, two algorithms for avoiding a defective sector, i.e., a Slipping Algorithm and a Linear Replacement Algorithm will be described.

FIG. 12 shows a defective sector and an alternative sector thereof to which the Slipping Algorithm is applied. The Slipping Algorithm is a defect handling algorithm conducted during disk inspection and formatting.

A user area and a spare area of a schematic area 1201 shown in FIG. 12 are formed as part of the data recording area 5 (FIG. 1C). The user area is provided for the purpose of actually storing data, and data is usually stored in this area. The spare area is provided for the purpose of handling a defective sector. More specifically, the spare area is provided considering that there may be a defective sector in the user area in which data cannot be stored due to a scratch or the like.

In order to access the user area, a disk is assigned a logical sector number (hereinafter, referred to as an "LSN"). A user or an external terminal controlling a disk recording and reproducing apparatus accesses a sector of a disk, using an LSN, and reads and writes data.

A logical area 1202 shown in FIG. 12 shows results obtained by handling a defective sector by the Slipping Algorithm. It is assumed that a defective sector SD1 having one sector of defect and a defective sector SD2 having two sectors of defect are present in the user area. The defective sectors SD1 and SD2 are not assigned LSNs, and three sectors which cannot be used due to defects are reserved by using the spare area. As a result, the user area formally extends to the spare area as shown in FIG. 12, and an area with the same capacity as that which can be used without any defects is reserved.

Thus, in accordance with the Slipping Algorithm, the use of an address of a defective sector registered in the PDL can be avoided. Furthermore, by prescribing the spare area as an alternative area of a defective sector, a required recording area can be reserved.

FIG. 13 shows defective sectors and alternative sectors thereof to which the Linear Replacement Algorithm is applied. The Linear Replacement Algorithm is a defect handling algorithm generally conducted during recording and reproduction of data.

In FIG. 13, it is assumed that defective sectors LD1 and LD2 are present in the user area. Data of the defective sectors LD1 and LD2 is reserved in a selectively specified area of the spare area. According to the Linear Replacement Algorithm, LSNs (e.g., LSN1 and LSN3) assigned to sectors before and after a defective sector refer to the sectors before and after the defective sector, and LSN2 between LSN1 and LSN3 refers to an alternative sector in the spare area.

Thus, according to the Linear Replacement Algorithm, a defective sector is registered in the SDL, and an alternative sector is accessed in place of the defective sector; thus, the alternative sector is used as an alternative to the defective sector.

Hereinafter, a procedure of disk initialization will be described.

Initialization of a disk is performed at least once before data is written onto the disk. The procedure of initialization is as follows. First, specific test pattern data is written onto all the sectors, and the sectors of the disk are inspected based on whether or not the written data can be correctly read from all the sectors.

As described above, a defective sector from which data cannot be read during the inspection in the course of disk initialization is handled as a defective sector by the Slipping Algorithm which generally performs PDL registration.

FIG. 14 shows a procedure of disk initialization.

When a recording and reproducing apparatus (not shown) starts initialization of a disk, the recording and reproducing apparatus sets an address of a leading edge of a sector to be initialized as an address initial setting value, and writes prepared test data onto the address of the leading edge. Thereafter, error determination E1 is performed. In the error determination E1, it is determined whether or not a sector address is normally read. The reason for this is that a sector address is required to be read first when data is written onto a sector, and in the case where an error occurs in reading the sector address, data cannot be written in the sector address.

When an address read error is detected in the error determination E1, a sector having an error is determined as a defective sector, and the sector address thereof is registered in a first list.

Next, a value of the sector address is increased by one, and test data is written. Thereafter, the error determination E1 is performed again. An address of a sector which is determined to be defective is registered in the first list. This operation is repeated until the final sector address is reached. Then, the leading address value is set as an address initial setting value, and data written onto the leading sector is read.

When data is read, error determination E2 is performed. In the error determination E2, it is determined whether or not read data is correct (i.e., data is successfully written). In the case where an error is detected in read data, a sector having an error is determined as a defective sector, and the sector address thereof is registered in a second list.

Next, a value of the sector address is increased by one, and data is read. Thereafter, the error determination E2 is performed again. An address of a sector which is determined to be defective is registered in the second list. This operation is repeated until the final sector address is reached. When registration in the second list is completed, the first list previously formed and the second list in which registration is completed are combined into one. At this time, the defective sector addresses registered in the combined list are sorted in the order of a sector address, and duplicate registered defective sectors are integrated into one, whereby a PDL as described above is formed. The PDL is stored in the disk information area 4 (FIG. 1C) of a disk.

FIG. 15A shows a position of a defective sector on the disk medium 1 (FIG. 1), and FIG. 15B shows the PDL in which the defective sector is registered.

More specifically, FIG. 15A shows that, for example, a sector at an address (track 0011, sector 02) of the disk is a defective sector. FIG. 15B shows an example of the PDL in which the address of the defective sector is registered as a track number and a sector number.

In the above-mentioned example, a sector at an address (track 0011, sector 02) is registered as a defective sector which cannot be accessed. It can be considered that in order to reserve a recording area corresponding to capacity of the defective sector on which data cannot be recorded, the user area extends to the address (track 0100, sector 00) of the spare area (FIGS. 12 and 13) and is administered by an LSN. At this time, an address (track number and sector number) of the defective sector is recorded in the PDL. Thus, in the case where this defective sector is accessed, the address (track 0011, sector 02) can be skipped.

Next, an operation during recording will be described.

An operation of recording data refers to an operation of writing specified data onto a specified sector. In an operation of recording data, a defective sector on which data cannot be written is handled as a defective sector in accordance with the Linear Replacement Algorithm which generally performs SDL registration.

FIG. 16 shows a procedure of recording data onto a disk.

A general recording and reproducing apparatus sets an address of a leading edge of a sector onto which data is recorded as an address initial setting value, and writes specified data from the leading edge of the addressed sector. Then, the recording and reproducing apparatus performs a verifying process for confirming the success of the write step. The verifying process refers to a process in which data is read from a sector for the purpose of confirming write of data.

After the data is read in the verifying process, it is determined in error determination E3 whether or not the data has been read and whether or not the read data is the same as the specified written data. In the case where the data cannot be read or the read data is different from the specified written data, an error is detected. In the case where the data is read and the read data is the same as the specified written data, an error is not detected. In the case where an error is detected in the read data, the sector which is being verified is determined as a defective sector, and an alternative sector is assigned to the defective sector based on the SDL. The specified data is written onto the alternative sector, and thereafter, the address of the sector determined as a defective sector which is being verified and the address of the alternative sector are registered in the SDL. In the case where an error is not detected in the error determination E3, the sector address is set to be a specified address. Write of data, the verifying process, and the error determination E3 are performed.

This operation is repeated, and after the specified final sector address is reached, the procedure is completed.

FIG. 17A shows positions of a defective sector and an alternative sector thereof on the disk medium 1 (FIG. 1), and FIG. 17B shows the SDL in which the defective sector and the alternative sector thereof are registered.

More specifically, FIG. 17A shows that, for example, a sector at an address (track 0012, sector 04) is a defective sector, and an alternative sector thereof is at an address (track 0100, sector 00). FIG. 17B shows an example of the SDL in which the addresses of the defective sector and the alternative sector thereof are registered by a track number and a sector number.

In the above example, a sector at an address (track 0012, sector 04) is registered as a defective sector which cannot be accessed. As an alternative sector of the defective sector at the address (track 0012, sector 04), a sector at an address (track 0100, sector 00) of the spare area is assigned. At this time, the addresses (track number and sector number) of the defective sector and the alternative sector are registered in the SDL. Thus, in the case where the address (track 0012, sector 04) is accessed, this address is skipped to the address (track 0100, sector 00), and data can be read from the sector at the address (track 0100, sector 00).

Two examples in which either one of the PDL or the SLD is utilized have been described. However, in actual recording and reproduction, both of the PDL and the SDL are generally used.

When a disk is used, disk initialization called formatting is performed only once in the beginning. A defective sector detected during formatting is registered in the PDL. A defective sector detected during recording of data onto a disk after disk initialization is registered in the SDL.

FIGS. 18A through 18C show positions of defective sectors and an alternative sector thereof on the disk medium 1 (FIG. 1), and the PDL and the SDL in which the defective sectors and the alternative sector are registered.

FIG. 18A shows positions of defective sectors and an alternative sector thereof on the disk medium 1 (FIG. 1). FIG. 18A shows that defective sectors SD3 and LD3 are at disk addresses (track 0011, sector 01) and (track 0010, sector 05), and a sector at an address (track 0100, sector 01) is an alternative sector of the defective sector LD3.

FIG. 18B shows the PDL in which the defective sector is registered.

FIG. 18C shows the SDL in which the defective sector and the alternative sector are registered.

A procedure in which the PDL and the SDL shown in FIGS. 18B and 18C is as described below.

First, in the disk initialization (FIG. 14), the sector SD3 at the address (track 0011, sector 01) is registered in the PDL as a defective sector. At this time, the Slipping Algorithm utilizing the PDL is used. An LSN is assigned to the sector of a spare area at the address (track 0100, sector 00), and the sector of the spare area is used as an extended area of a user area.

When the sector LD3 at the address (track 0010, sector 05) is determined to be defective in the recording of data onto a disk (FIG. 16), a sector at an address (track 0100, sector 01) of the spare area is assigned as the alternative sector of the sector LD3. Then, the addresses of the defective sector LD3 and the alternative sector thereof in the spare area are registered in the SDL.

Herein, it will be described that the alternative sector of the defective sector LD3 registered in the SDL is at an address (track 0100, sector 01). Since the number of entries registered in the PDL is one in the defect handling during the previously performed disk initialization, it is understood that an LSN is assigned to one sector from the leading edge of the spare area, and this sector is used as an area extended from the user area. Thus, it can be considered that the sectors following the first sector, i.e., the second sector at an address (track 0100, sector 01) from the leading edge of the spare area and the subsequent sectors are non-assigned areas. As a result the sector at the address (track 0100, sector 01) can be used as an alternative sector of the defective sector detected during recording of data.

As described above, by using both the PDL and the SDL, defects can be handled with respect to all the defective sectors which may be present in the case of the ordinary use of a disk (from disk initialization to data recording and reproduction).

In the above-mentioned method for managing a defect of a disk, a defect is handled only in a sector which is actually determined to have an error in the error determinations E1, E2 (FIG. 14), and E3 (FIG. 16).

However, even a sector which is not determined to have an error may not be accessed. For example, when a scratch causing a tracking error is present in a sector before a target sector (i.e., a sector on which data is to be recorded and from which data is to be reproduced), a track cannot be traced at a time of access. Furthermore, even an address of the target sector may not be read. This is because, considering a rotating disk, the access to the target sector is required to start from a sector before the target sector of a track which cannot be traced. Therefore, an address for accessing the target sector cannot be read, and data cannot be recorded onto or reproduced from the target sector.

FIG. 19 shows a tracking error state in which a head cannot trace a track when trying to access it because of a scratch at an address (track 0011, sector 02) by using a path of the head.

According to a conventional method, as shown in FIG. 20, a sector at the address (track 0011, sector 02) is registered as a defective sector in the PDL or the SDL, and then, a head tries to access a subsequent address (track 0011, sector 03). However, in most cases, the track cannot be traced, resulting in a tracking error. This is because, in order to read data from a sector at the address (track 0011, sector 03), a head is required to access a trailing edge of a sector at the previous address (track 0011, sector 02) at which the head is side-tracked due to a scratch. The head repeats the same movement a couple of times (i.e., the head tries to access the address (track 0011, sector 03). However, a tracking error occurs, making it impossible for the head to access the subsequent sector.

According to the conventional method, in the case where there is a defective sector which prevents a head from tracing a track, only the access to the defective sector is avoided. Therefore, the subsequent sector cannot be accessed.

SUMMARY OF THE INVENTION

A method for managing a defect of a disk of the present invention is provided, the disk including a plurality of tracks, each of the plurality of tracks being divided into a plurality of sectors, the method including the steps of: detecting a defective sector which cannot be traced physically among the plurality of sectors; and registering the defective sector and at least one sector following the defective sector in a defect list as defective sectors.

In one embodiment of the present invention, the above-mentioned method further includes the step of recording data onto an alternative sector which is different from the defective sector registered in the defect list by using a Slipping Algorithm.

In another embodiment of the present invention, the above-mentioned method further includes the step of recording data onto an alternative sector which is different from the defective sector registered in the defect list by using a Linear Replacement Algorithm.

A disk recording and reproducing apparatus of the present invention accesses a disk including a plurality of tracks, each of the plurality of tracks being divided into a plurality of sectors, wherein the disk recording and reproducing apparatus includes: a disk rotating portion for rotating the disk; a head tracing the plurality of tracks for the purpose of recording a signal onto the disk or reading a signal from the disk; an actuator moving the head relative to the disk; and a controller controlling the actuator, and wherein the controller determines a track jump distance, based on either of a maximum movement distance of the actuator and a distance in which the head is moved within a period of time during which the disk rotates by one of the plurality of sectors, and after controlling the actuator in such a manner that the head moves to one of the plurality of tracks away from a target track which the head is desired to access by the track jump distance, further controls the actuator in such a manner that the head accesses the target sector.

In one embodiment of the present invention, the controller detects a defective sector which cannot be traced physically among the plurality of sectors included in the plurality of tracks, registers the defective sector and at least one sector following the defective sector in a defect list as defective sectors, records data onto an alternative sector which is different from the defective sector registered in the defective list by using a Slipping Algorithm, and reproduces the recorded data.

In another embodiment of the present invention, the controller detects a defective sector which cannot be traced physically among the plurality of sectors included in the plurality of tracks, registers the defective sector and at least one sector following the defective sector in a defect list as defective sectors, records data onto an alternative sector which is different from the defective sector registered in the defective list by using a Linear Replacement Algorithm, and reproduces the recorded data.

An information recording medium of the present invention includes at least one track, each of the at least one track being divided into a plurality of sectors, wherein position information of a defective sector which cannot be traced physically and position information of at least one of the plurality of sectors following the defective sector are recorded.

Alternatively, an information recording medium of the present invention includes a plurality of zones, each of the plurality of zones including at least one track, each of the at least one track being divided into a plurality of sectors, wherein a block with an error correction code calculated is formed across at least two of the plurality of sectors, and position information of the block including a defective sector which cannot be traced physically among the plurality of sectors and position information of the block having at least one of the plurality of sectors following the defective sector are recorded.

A method for managing a defect of a disk is provided, the disk including a plurality of zones, each of the plurality of zones including a plurality of tracks, each of the plurality of tracks being divided into a plurality of sectors, blocks each having an error correction code calculated being formed across at least two of the plurality of sectors, the method including the steps of: detecting a defective sector which cannot be traced physically among the plurality of sectors; and registering a first one of the blocks including the defective sector and a second one of the blocks including at least one of the plurality of sectors following the defective sector as defective sectors.

Thus, the invention described herein makes possible the advantages of (1) providing a highly reliable disk defect management method which enables a head to access a subsequent sector without fail even in the presence of a defective sector which prevents the head from tracing a track; and (2) providing a highly reliable disk recording and reproducing apparatus which enables a head to access a subsequent sector without fail even in the presence of a defective sector which prevents the head from tracing a track.

These and other advantages of the present invention will become apparent to those skilled in the art upon reading and understanding the following detailed description with reference to the accompanying figures.

BRIEF DESCRIPTION OF THE DRAWINGS

FIGS. 15A and 15B respectively show a position of a defective sector on a disk medium and a PDL in which the defective sector is registered.

DESCRIPTION OF THE PREFERRED EMBODIMENTS

Hereinafter, the present invention will be described by way of illustrative embodiments with reference to the drawings.

Figure 1A:
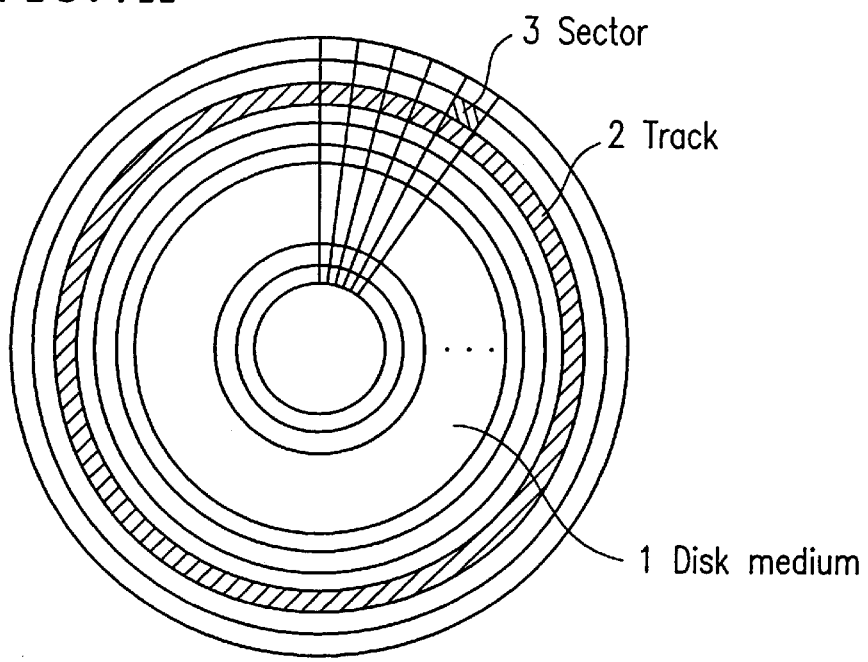
FIGS. 1A through 1C are diagrams each showing a general physical and logical structure of a disk medium.
Figure 1B:
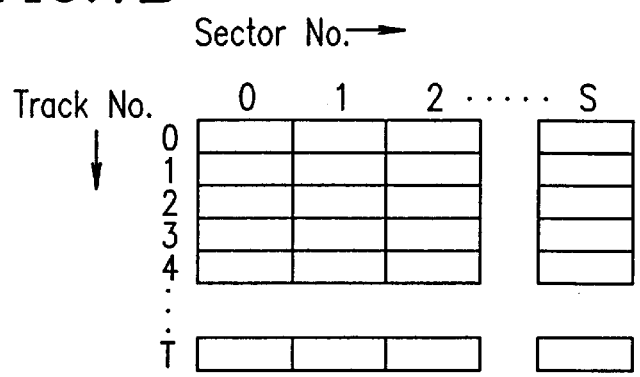
Figure 1C:
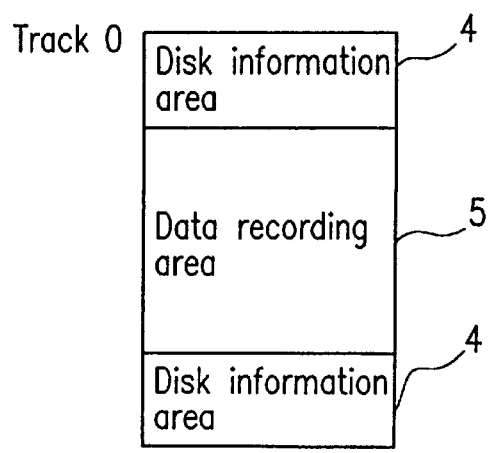

A disk medium described in the following embodiments has a structure of the disk medium 1 as shown in FIGS. 1A through 1C. The disk medium 1 in a circular shape includes a plurality of concentrically formed tracks 2. Each track 2 is divided into a plurality of sectors 3 in a radius direction. A leading edge of each sector 3 is provided with an absolute address called a physical sector address.

In the case where a defect is found in a sector during recording and reproduction of data in the disk medium 1 shown in FIGS. 1A through 1C, a sector having a defect is registered as a defective sector in a Primary Defect List (hereinafter, referred to as a "PDL") or a Secondary Defect List (hereinafter, referred to as an "SDL"). By utilizing the PDL or the SDL, or both, the use of a defective sector can be avoided during recording and reproduction of data under a certain condition, and reliability of data recording and reproduction can be ensured.

Embodiment 1

Initialization of a disk is performed at least once before data is written onto a disk. Specific test pattern data is written onto all the sectors, and the sectors of the disk are inspected based on whether or not the written data can be correctly read from all the sectors. A sector from which the data cannot be correctly read during the inspection in the course of the disk initialization is handled as a defective sector by the Slipping Algorithm which generally performs PDL registration.

Figure 2:
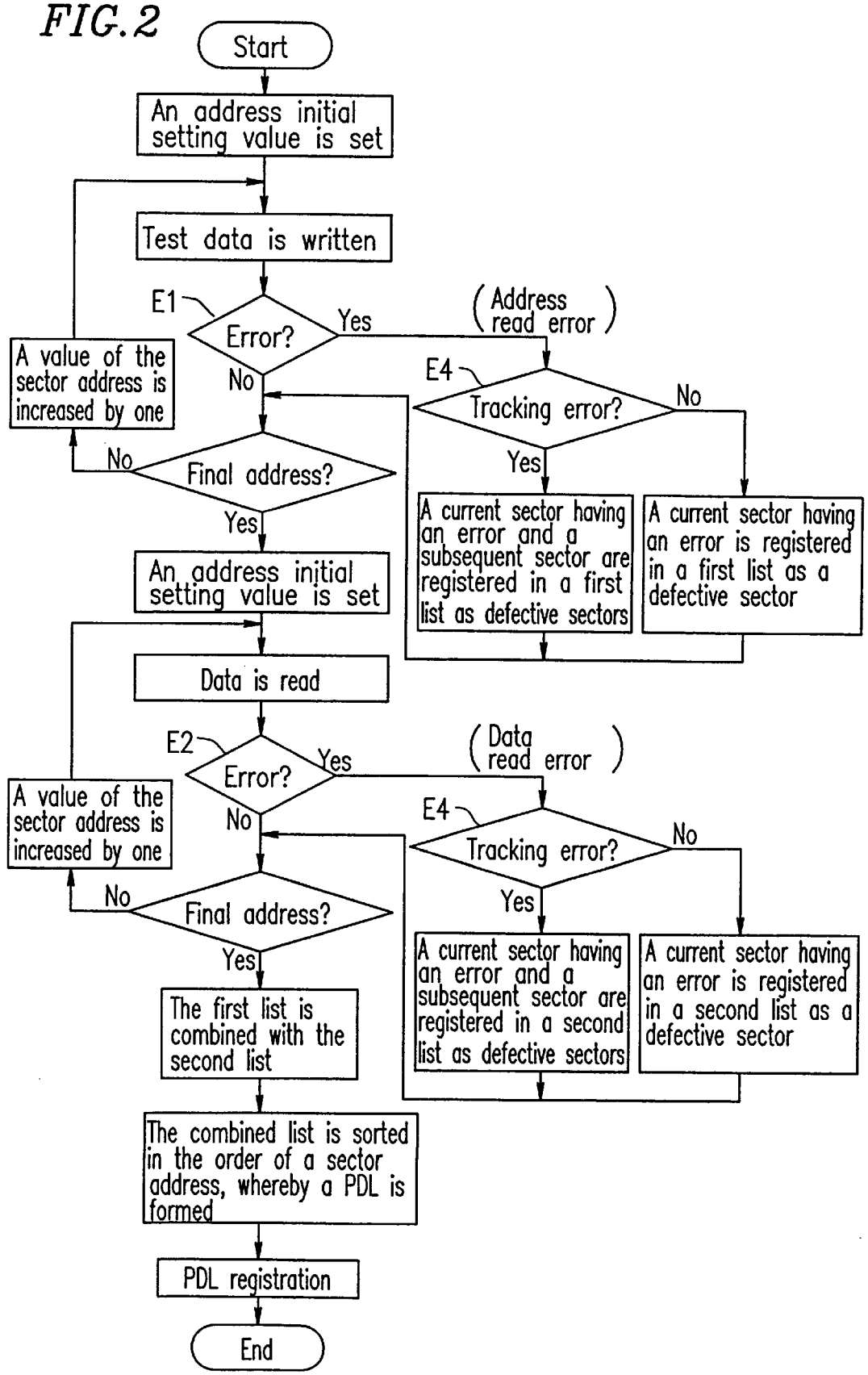
FIG. 2 is a flow chart showing a procedure of disk initialization in Embodiments 1 and 5 of the present invention.

FIG. 2 is a flow chart showing a procedure of disk initialization in Embodiment 1 of the present invention.

When a recording and reproducing apparatus (not shown) starts initialization of a disk, the recording and reproducing apparatus sets a leading sector address of a leading sector among sectors to be initialized as an address initial setting value, and writes prepared test data onto the leading sector address. Herein, the leading sector address refers to an address of a leading sector positioned at a leading edge of the data recording area (FIG. 1C). Thereafter, error determination E1 is performed. In the error determination E1, it is determined whether or not a sector address is normally read. The reason for this is that a sector address is required to be read first when data is written onto a sector, and in the case where an error occurs in reading the sector address, data cannot be written onto the sector address.

When an address read error is detected in the error determination E1, an error content is determined in tracking error determination E4. In the tracking error determination E4, it is determined whether or not the error detected in the error determination E1 was caused by a tracking error in which a track cannot be traced physically. In the tracking error determination E4, it is determined whether of not the error detected in the error determination E1 is an error which is substantially permanently present (e.g., an error caused by a scratch in a sector), based on whether or not the error is a tracking error.

In the case where it is determined that the error is a tracking error in the tracking error determination E4, sector addresses of the current sector having an error and the subsequent sector are registered in a first list. In the case where it is determined that the error is not a tracking error in the tracking error determination E4, the sector address of the current sector is registered in the first list, with the current sector being a defective sector.

Next, a value of the sector address is increased by one, and test data is written. The error determination E1 is performed. This is repeated until the final sector address is reached. The leading sector address is set again as an address initial setting value, and data is read from the leading sector.

After the data is read, it is determined whether or not the data read in error determination E2 is correct, i.e., write of the data is successful. In the case where an error is detected in the data, an error content is determined in the tracking error determination E4.

In the tracking error determination E4, it is determined whether or not the error detected in the error determination E2 was caused by a tracking error in which a track cannot be traced physically. An error is detected in the tracking error determination E4 only when a scratch is present in a track, for example, and a sector in the defective track cannot be accessed.

In the case where it is determined that the error is a tracking error in the tracking error determination E4, addresses of the current sector having an error and the subsequent sector are registered in a second list. In the case where it is determined that the error is not a tracking error in the tracking error determination E4, the address of the current sector is registered in the second list, with the current sector being a defective sector.

Next, a value of the sector address is increased by one, and data is read. The error determination E2 and the tracking error determination E4 are performed. This is repeated until the final sector address is reached. After registration in the second list is completed, the first list previously formed and the second list in which registration is completed are combined into one list. At this time, the defective sector addresses registered in the combined list are sorted in the order of a sector address, and duplicate registered defective sectors are integrated into one, whereby a PDL as described above is formed and stored in a disk.

Figures 3A, 3B:
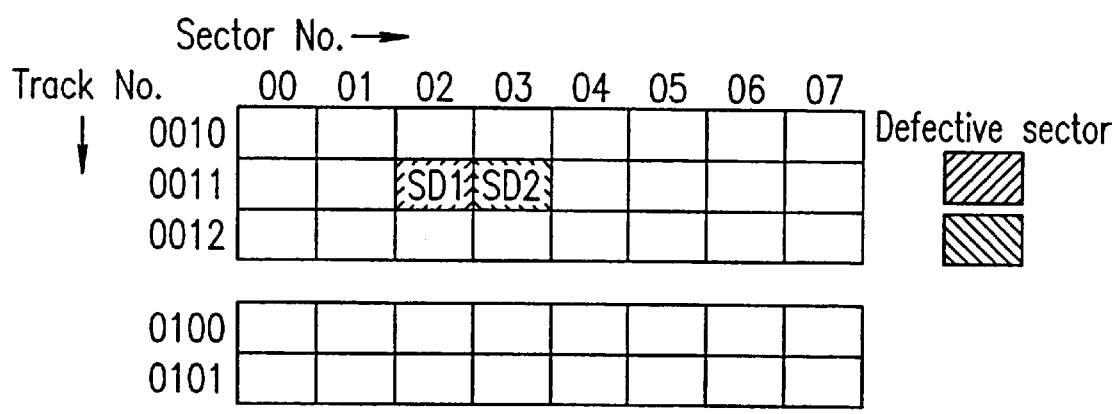
FIGS. 3A and 3B respectively show positions of defective sectors and a PDL in Embodiments 1 and 5 of the present invention.

FIG. 3A shows exemplary sectors on a disk which are determined to be defective according to the present invention, and FIG. 3B shows exemplary defective sectors registered in the PDL.

In the case where a sector SD1 at an address (track 0011, sector 02) in FIG. 3A is determined to have an error in the error determinations E1 and E2 (FIG. 2), and is determined to have a tracking error in the tracking error determination E4 (FIG. 2), a subsequent sector SD2 at an address (track 0011, sector 03) is determined to be defective. As is understood from FIG. 3B showing the PDL corresponding to this case, the sector address (track 0011, sector 02) of the sector SD1 is registered in an entry PDE1, and the sector address (track 0011, sector 03) of the sector SD2 is registered in an entry PDE2.

According to the PDL, in the case where the sectors SD1 and SD2 are accessed, these sectors are determined to be defective, and can be skipped. Furthermore, even in the presence of a defective sector causing a tracking error in which a track cannot be traced physically due to a scratch or the like, since the subsequent sector of the sector having a tracking error is also registered in the PDL as a defective sector, the situation in which the sector (e.g. one sector) following the sector having a tracking error cannot be accessed due to a tracking error can be completely avoided, and highly reliable defect management of a disk can be realized.

Embodiment 2

Recording data onto a disk refers to an operation in which specified data is written onto a specified sector. A sector from which data cannot be read during inspection in the course of recording of data onto a disk is handled as a defective sector by the Linear Replacement Algorithm which generally performs SDL registration.

Figure 4:
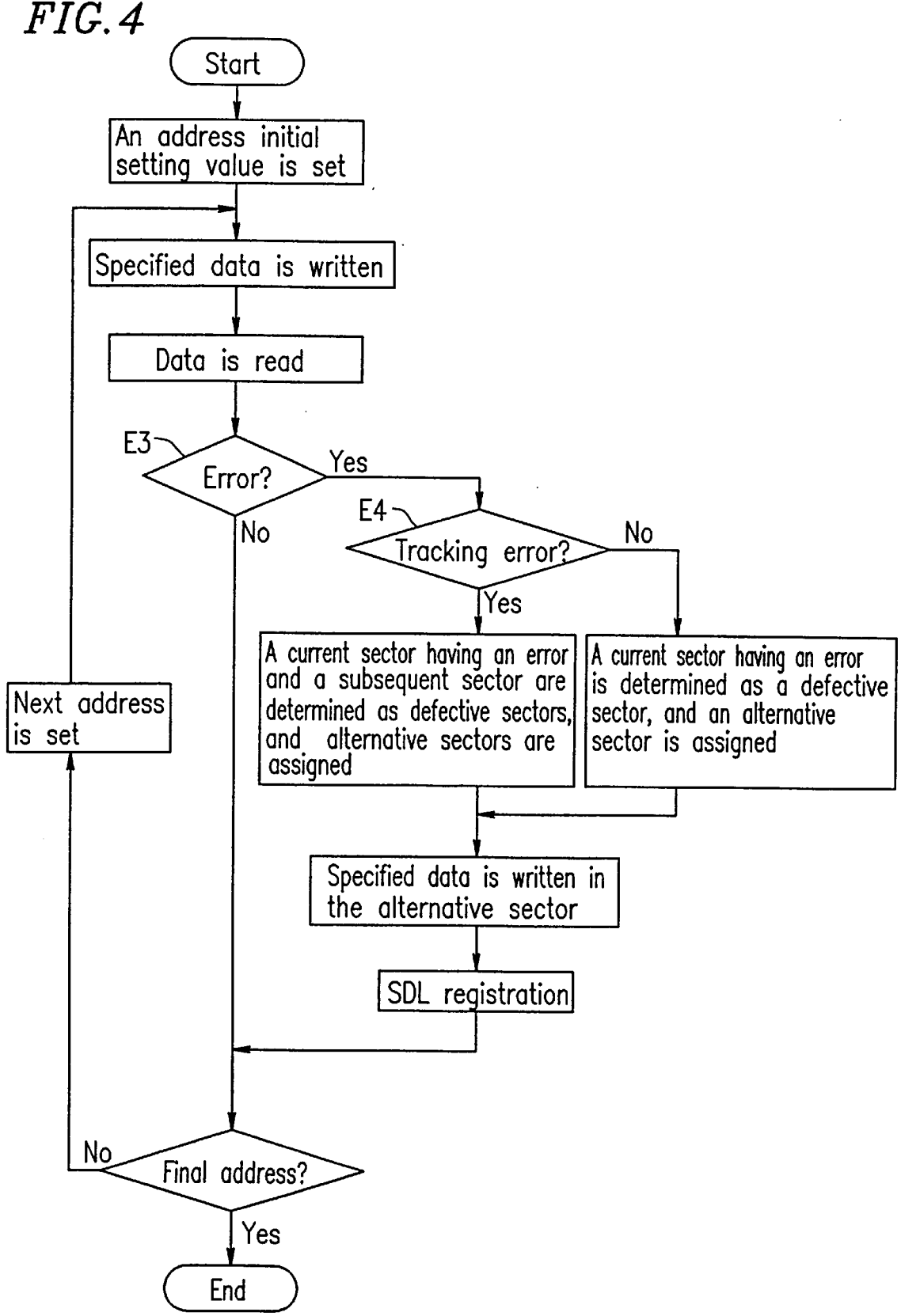
FIG. 4 is a flow chart showing a procedure of recording data onto a disk in Embodiments 2 and 6 of the present invention.

FIG. 4 is a flow chart showing an operation in which data is recorded onto a disk in Embodiment 2 of the present invention.

A general recording and reproducing apparatus (not shown) sets a leading sector address in an area on a disk onto which data is recorded as an address initial setting value, and writes specified data from a leading edge of an addressed sector. Then, the recording and reproducing apparatus performs a verifying process for confirming whether or not the write step is successful. The verifying process refers to a process in which data is read from a sector for the purpose of confirming whether or not data is written.

After the data is read in the verifying process, it is determined in error determination E3 whether or not the specified data has been written. More specifically, it is determined whether or not the data has been read and whether or not the read data is the same as the specified written data. In the case where the data cannot be read or the read data is different from the specified written data, an error is detected. In the case where the data is read and the read data is the same as the specified written data, an error is not detected. In the case where an error is detected in the read data, an error content is determined in tracking error determination E4.

In the tracking error determination E4, it is determined whether or not the error detected in the error determination E3 is a tracking error in which a track cannot be traced physically.

In the case where it is determined that the error is a tracking error in the tracking error determination E4, the current sector having an error and the subsequent sector are determined to be defective sectors, and two alternative sectors are assigned based on an SDL. In the case where it is determined that the error is not a tracking error in the tracking error determination E4, only the current sector is determined to be a defective sector, and one alternative sector is assigned based on the SDL. Specified data which has not been correctly written is written onto the alternative sector. The defective sector address and the alternative sector address are registered in the SDL.

Thereafter, a sector address is set at a specified address, and write of data, the verifying process, the error determinations E3 and E4 are performed.

When the above-mentioned operation is repeated, and the specified final sector address is reached, recording of data onto a disk is completed.

Figure 5A:
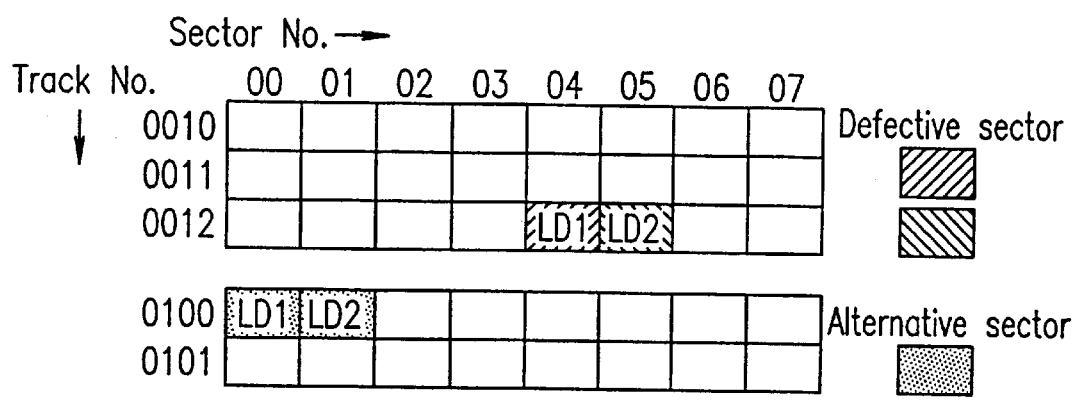
FIGS. 5A and 5B respectively show positions of defective sectors and alternative sectors, and an SDL in Embodiments 2 and 6 of the present invention.
Figure 5B:
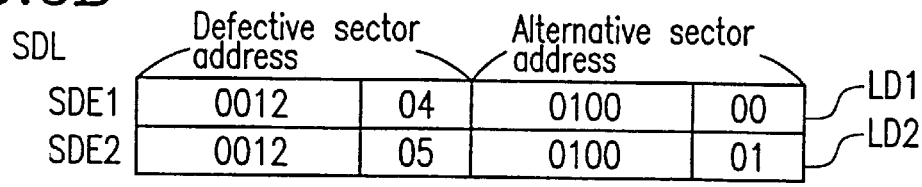

FIG. 5A shows sectors on a disk which are determined to be defective according to the present invention and alternative sectors, and FIG. 5B shows the defective sectors and the alternative sectors registered in the SDL.

In the case where a sector LD1 at an address (track 0012, sector 04) in FIG. 5A is determined to have an error in the error determination E3 (FIG. 4), and the error is determined to be a tracking error in the tracking error determination E4 (FIG. 4), a subsequent sector LD2 at an address (track 0012, sector 05) is determined to be a defective sector. Herein, two alternative sectors at addresses (track 0100, sector 00) and (track 0100, sector 01) are reserved. As is understood from FIG. 5B showing the SDL corresponding to this case, the sector address (track 0012, sector 04) of the defective sector LD1 and the sector address (track 0100, sector 01) of the alternative sector are registered in an entry SDE1, and the sector address (track 0012, sector 05) of the defective sector LD2 and the sector address (track 0100, sector 02) of the alternative sector are registered in an entry SDE2.

According to the SDL, in the case where the sectors LD1 and LD2 are accessed, these sectors are determined to be defective, and can be skipped. Furthermore, even in the presence of a defective sector causing a tracking error in which a track cannot be traced physically due to a scratch and the like, since the sector (e.g., one sector) following the sector having a tracking error is also registered as a defective sector in the SDL, the situation in which the sector following the sector having tracking error cannot be accessed due to a tracking error can be avoided, and highly reliable defect management of a disk can be realized.

Furthermore, there is a possibility that an address read error and a data error occur even during writing of data. Therefore, in the present embodiment, immediately after write of specified data from a leading edge of an addressed sector and immediately after write of specified data onto the alternative sector, as well as immediately after the verifying process, the following process is performed: the error determinations E3 and E4 are performed, and an alternative sector is assigned to a defective sector, followed by SDL registration. Thus, more highly reliable disk defect management can be realized.

Embodiment 3

In general, when a disk is used, disk initialization called formatting is performed only once at the beginning. After formatting is completed, data is recorded. A defective sector detected during disk initialization is registered in a PDL in accordance with the method described in Embodiment 2, and the Slipping Algorithm is performed. A defective sector detected during recording after disk initialization is registered in an SDL in accordance with the method described in Embodiment 2, and the Linear Replacement Algorithm is performed.

Figure 6A:
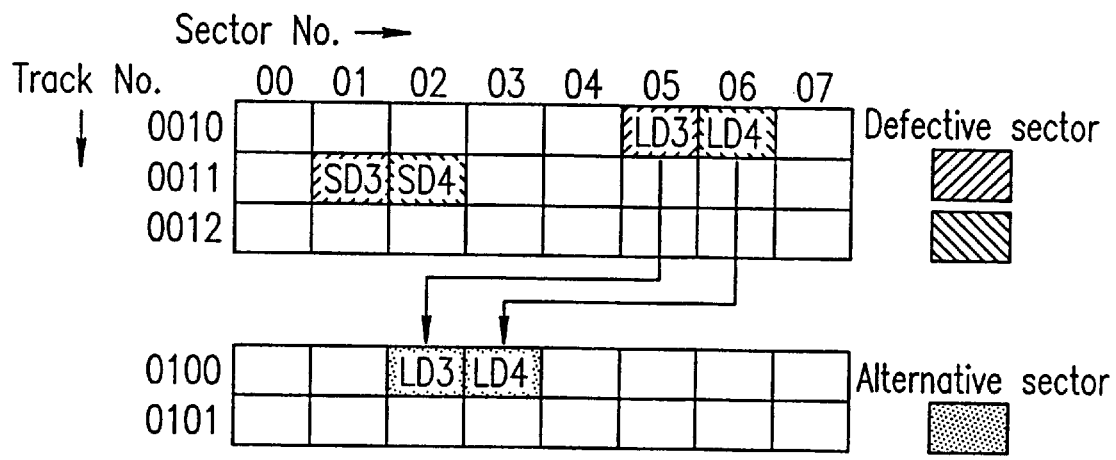
FIGS. 6A through 6C respectively show positions of defective sectors and alternative sectors, a PDL, and an SDL in Embodiments 3 and 7 of the present invention.

FIG. 6A shows defective sectors and alternative sectors thereof to which the Slipping Algorithm using the PDL and the Linear Replacement Algorithm using the SDL are applied in Embodiment 3.

Figure 6B:
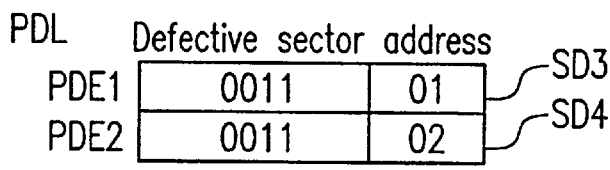

FIG. 6A shows positions of sectors when one defective sector caused by a scratch is detected during disk initialization, and one defective sector caused by a scratch is detected during recording of data. A sector SD3 at an address (track 0011, sector 01) and a sector SD4 at an address (track 0011, sector 02) in FIG. 6A are a defective sector detected during disk initialization and the subsequent sector thereof, respectively. The addresses of these sectors are registered in the PDL in FIG. 6B. At this time, LSNs are assigned to two sectors at addresses (track 0100, sector 00) and (track 0100, sector 01) in the spare area by the Slipping Algorithm using the PDL, and these two sectors are used as an area extended from the user area.

Figure 6C:
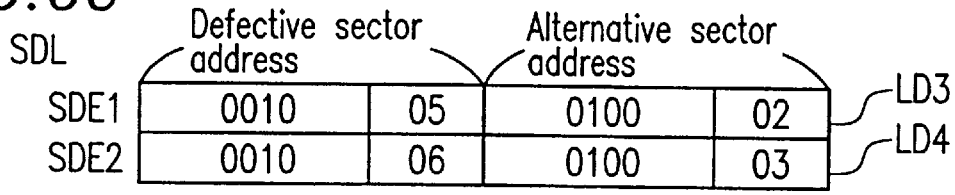

Referring to FIG. 6A again, a sector LD3 at an address (track 0010, sector 05) and a sector LD4 at an address (track 0010, sector 06) are a defective sector detected during recording of data and the subsequent sector thereof, respectively, and these sectors use sectors at addresses (track 0100, sector 02) and (track 0100, sector 03) as alternative sectors. The addresses of these sectors are registered in the SDL in FIG. 6C. Thus, when the sectors LD3 and LD4 are accessed, the alternative sectors registered in the SDL are accessed by the Linear Replacement Algorithm, whereby recording and reproduction of data becomes possible.

Hereinafter, the addresses (track 0100, sector 02) and (track 0100, sector 03) of the alternative sectors of the sectors LD3 and LD4 registered in the SDL will be described.

Two entries are registered in the PDL in defect management during the previously performed disk initialization. Therefore, it is understood that LSNs are assigned to two sectors from the leading edge of the spare area, and these two sectors are used as an area extended from the user area. The third sector (track 0100, sector 02) from the leading edge of the spare area and the following sectors can be determined to be a non-assigned area, so that these sectors can be used as alternative sectors during recording of data.

According to the disk defect management method in Embodiment 3, any defective sector in a generally used disk during disk initialization and during recording and reproduction of data can be handled, and the same effects as shown in Embodiments 1 and 2 can be simultaneously obtained. More specifically, in defective sector handling to which the Slipping Algorithm using the PDL and the Linear Replacement Algorithm using the SDL are applied, when a defect in which a track cannot be traced physically due to a scratch in a sector is present, the defective sector and one subsequent sector thereof are registered in the PDL and the SLD as defective sectors, whereby the subsequent sectors of the defective sector can be accessed. As a result, highly reliable disk defect management can be realized.

Embodiment 4

Figure 7:
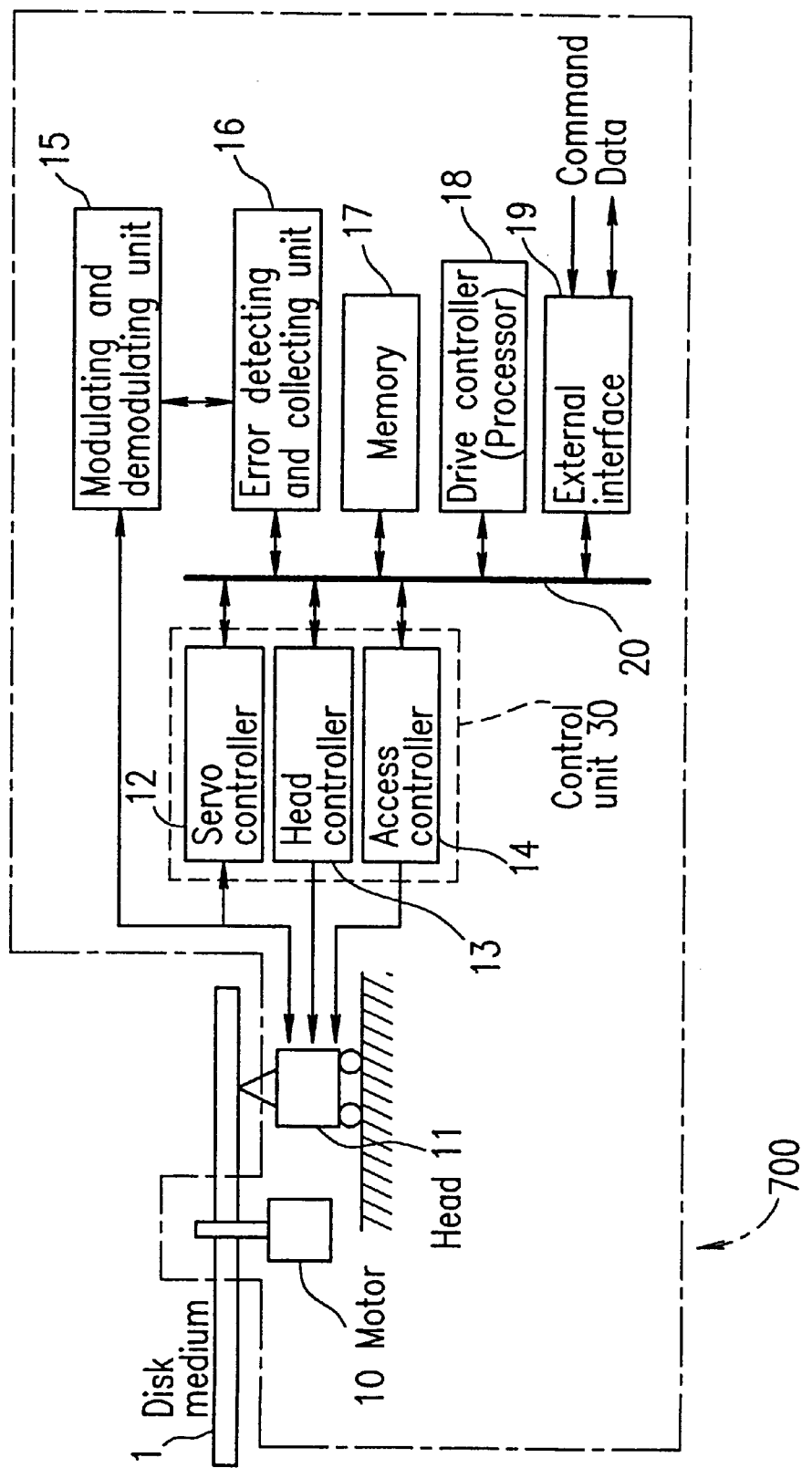
FIG. 7 is a block diagram showing a structure of a disk recording and reproducing apparatus of the present invention.

FIG. 7 shows a structure of a disk recording and reproducing apparatus 700 in Embodiment 4 of the present invention. The disk recording and reproducing apparatus 700 is used for recording data onto the disk medium 1 or reproducing data therefrom. The disk recording and reproducing apparatus 700 includes a motor 10, a head 11, a control unit 30, a modulating and demodulating unit 15, an error detecting and correcting unit 16, a memory 17, a drive controller 18, an external interface 19, and a bus 20. Herein, the control unit 30 includes a servo controller 12, a head controller 13, and an access controller 14.

Hereinafter, functions of the components included in the disk recording and reproducing apparatus 700 will be described. The disk medium 1 described below is assumed to be the same as that shown in FIG. 1.

The motor 10 rotates and stops the disk medium 1. The motor 10 is driven by the access controller 14 when the disk medium 1 is accessed, and stops when the access to the disk medium 1 is completed.

The head 11 records data onto the disk medium 1 and reproduces data therefrom. In the case where the disk medium 1 is an optical disk, the head 11 is composed of a part using a laser beam and a lens, and an actuator (not shown) which is to be a base of the part. Herein, the actuator is a mechanism for fine adjustment of the movement of the head 11 between tracks, which is indispensable for access by the head 11.

The servo controller 12, the head controller 13, and the access controller 14 included in the control unit 30 will be described.

The servo controller 12 performs tracking adjustment with respect to the head 11 so that a track can be traced, and detects a tracking error.

The head controller 13 instructs the actuator of the head 11 for fine adjustment of tracking.

The access controller 14 instructs the head 11 and the motor 10 for track movement and sector movement. Thus, the access controller 14 plays a central role in control of access to a disk.

The modulating and demodulating unit 15 demodulates analog data read from the head 11 into an original bit string, or modulates a bit string to send it to the head 11 for recording. More specifically, the modulating and demodulating unit 15 inputs and outputs recording and reproducing data with respect to the head 11.

After data recorded on the disk medium 1 is read by the head 11, the error detecting and correcting unit 16 performs error detection with respect to a data string received from the modulating and demodulating unit 15. As a result of the error detection, when an error is detected, the error detecting and correcting unit 16 performs correction. In general, code processing such as CRC and ECC (Error Correction code) is performed, and a data string for this purpose is stored on the disk medium 1.

The memory 17 has an area used as an intermediate buffer during recording and reproduction of data, an area for the error detecting and correcting unit 16 to perform operation, and the like. Thus, the memory 17 is used for general data processing.

The drive controller 18 is connected to the servo controller 12, the head controller 13, the access controller 14, the error detecting and correcting unit 16, and the memory 17 through the bus 20. The drive controller 18 instructs the servo controller 12, the head controller 13, and the access controller 14 of the control unit 30, thereby controlling the entire apparatus. Typically, the drive controller 18 is a processor. Software for operating the processor is stored in the memory 17.

The external interface 19 is connected to the bus 20. The external interface 19 receives a command and data input to the disk recording and reproducing apparatus 700 from outside, or outputs a command or data from the disk recording and reproducing apparatus 700.

An operation in which the disk recording and reproducing apparatus 700 constructed as described above records data onto the disk medium 1 and reproduces data therefrom will be described.

A general operation of recording data onto the disk medium 1 will be described with the passage of time.

When the external interface 19 receives a write command from outside, the drive controller 18 analyzes the command, and determines at which position the disk medium 1 data is to be stored. When the position where the data is to be stored is determined, the drive controller 18 prepares for receiving the data. The data input to the external interface 19 is once stored in the memory 17 and provided with an error-correcting code by the error detecting and correcting unit 16.

When the data to be recorded is ready, the drive controller 18 instructs the access controller 14, the servo controller 12, and the head controller 13 so that they access a leading sector among sectors at the previously determined storage position. The access controller 14, the servo controller 12, and the head controller 13 instructed by the drive controller 18 operates the motor 10 and the head 11 so as to allow them to access the leading sector. The error detecting and correcting unit 16 sends the data prepared on the memory 17 to the modulating and demodulating unit 15. The modulating and demodulating unit 15 modulates the data. Thereafter, the head 11 records the data from the leading sector. Hereinafter, it will be described that data is recorded onto a sector address specified by the drive controller 18 in the similar manner.

In recording of data onto the disk medium 1, in order to confirm whether or not recorded data is stored onto the disk medium 1, a verifying process for reading the data once recorded onto a sector and checking it is performed.

Next, a general operation of reproduction of data from the disk medium 1 will be described with the passage of time.

When the external interface 19 receives a read command from outside, the drive controller 18 analyzes the command, and calculates a read position of data to be reproduced from the disk medium 1. When the read position of the data to be reproduced is calculated, the drive controller 18 prepares for reading the data. On the other hand, when the read position of the data is determined, the drive controller 18 instructs the access controller 14, the servo controller 12, and the head controller 13 so that they access a leading sector among sectors at the previously determined read position. When the motor 10 and the head 11 access the leading sector in accordance with the instruction from the drive controller 18, the data is read. The read data is demodulated by the modulating and demodulating unit 15, and temporarily stored in the memory 17. At this time, the error detecting and correcting unit 16 performs error detection and correction. The data stored in the memory 17 is output from the external interface 19 by the drive controller 18. Hereinafter, it will be described that data specified by a command is reproduced in the similar manner.

Next, in the operation of the disk recording and reproducing apparatus 700, the case where the head 11 deviates from a target track while tracing due to a scratch on the disk medium 1 will be described. In this case, the servo controller 12 detects that the head 11 fails to trace the target track. The servo controller 12 recognizes this situation as a tracking error, and determines that access should be performed avoiding a sector in a track having a tracking error. In order to avoid the sector having a tracking error, the access controller 14 and the head controller 13 perform twostage access as described below.

The access controller 14 moves the head 11, and allows the head 11 to perform a seek operation in a track in the neighborhood of the specified track (target track). The actuator of the head 11 is moved to the target sector by the head controller 13, whereby a seek from the neighboring track to the target track is performed. As a result, the target sector in the target track (i.e., the target address) can be accessed. Herein, an intertrack distance between the neighboring track, which is a track jump position at the first stage, and the target track is determined by a distance within a movable range of the actuator of the head 11 or a distance in which the actuator of the head 11 can be moved while the disk medium 1 rotates by one sector. Herein, the distance within a movable range of the actuator refers to a distance dependent upon the performance of hardware, which is a maximum movable distance (fixed value) uniquely determined by hardware.

Figure 8:
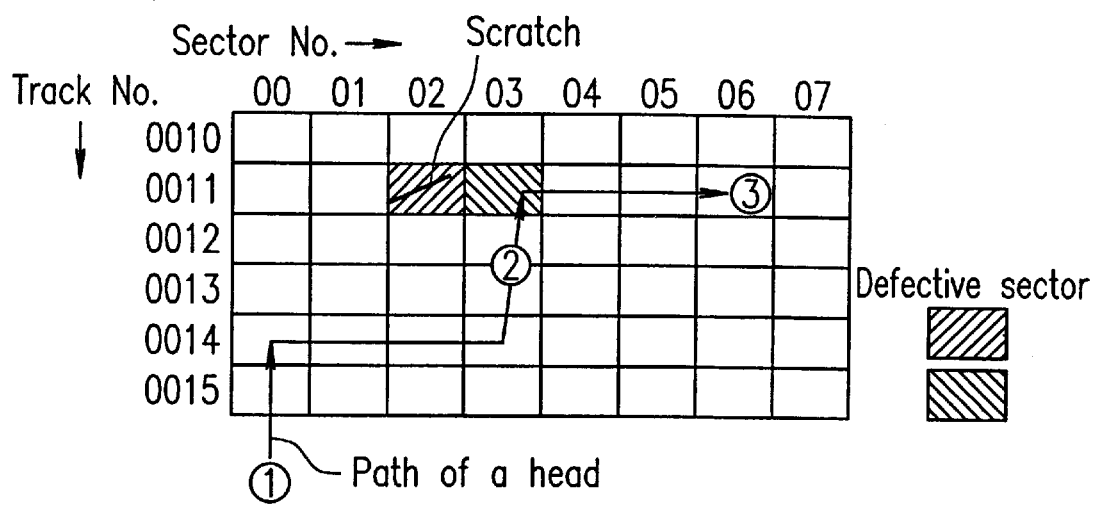
FIG. 8 is a diagram showing a head operation during two-stage disk access in Embodiment 4 of the present invention.

FIG. 8 illustrates the two-stage disk access by using a path of the head 11. Herein, access to an address (track 0011, sector 04) is exemplified. It is assumed that a scratch on the disk is present in the track 0011. The path of the head 11 is represented by Nos. 1 to 3.

At the first stage of access, the head 11 jumps to a neighboring track 0014. At the second stage of access, considering the rotation of a disk, the head 11 jumps to a target address (track 0011, sector 04). Actually, instead of jumping to the target address (track 0011, sector 04) directly, the head 11 jumps to a sector away from the target address (track 0011, sector 04) which is in the same track as that of the target address. The head 11 accesses the target address (track 0011, sector 04) as the disk medium 1 rotates. FIG. 8 shows that the head 11 jumps to, for example, a sector at an address (track 0011, sector 03). This is because it is difficult for the head 11 to directly jump to a sector address area at the leading edge of each sector since the disk medium 1 is rotating.

The intertrack distance between the neighboring track and the target track is 3 in this example. This distance is determined by the performance of the actuator of the head 11, as described above. Thus, access from a farther point is possible depending upon the performance of the actuator.

The two-stage access is performed as described above.

Next, an operation will be described, in which the disk recording and reproducing apparatus 700 accesses a desired sector in a desired track, in the case where a large scratch which causes the head 11 to skip a plurality of tracks.

Figure 9:
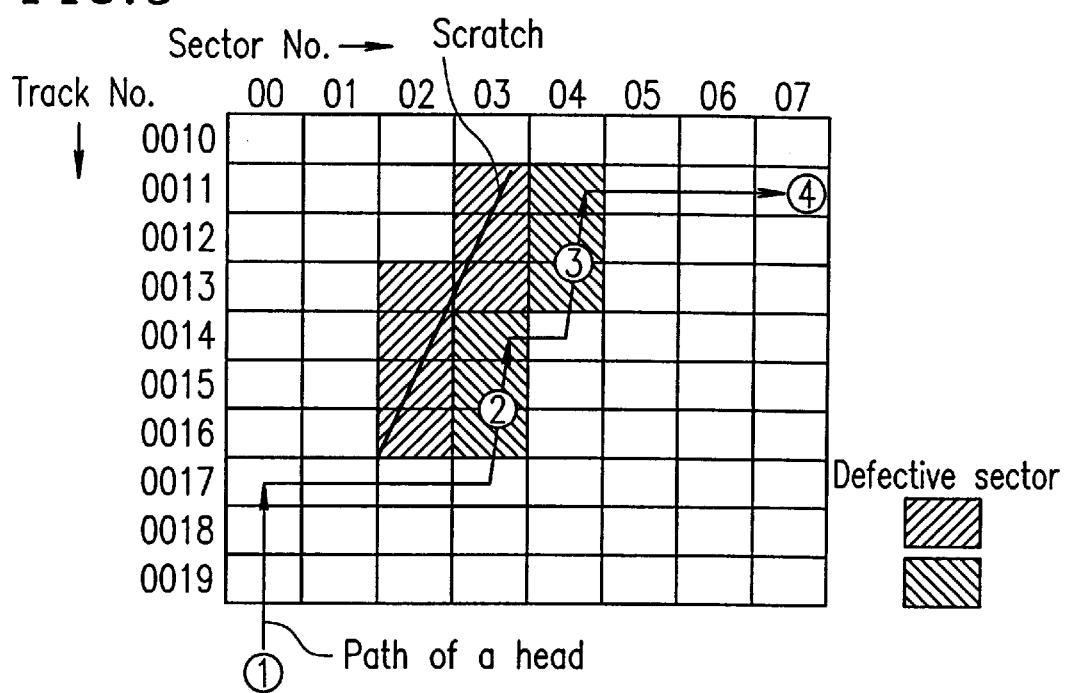
FIG. 9 is a diagram showing a head operation during three-stage disk access in Embodiment 4 of the present invention.
Figures 10A, 10B:
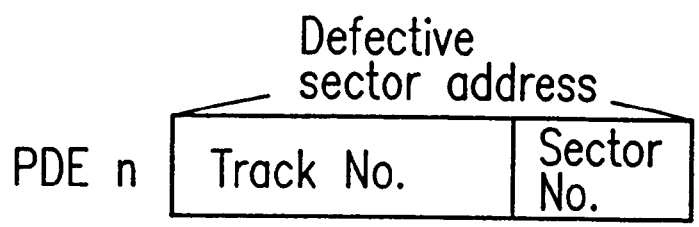
FIGS. 10A and 10B illustrate a Primary Defect List (PDL).
Figure 11A:
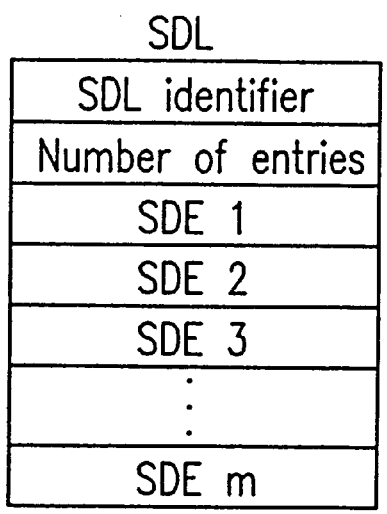
FIGS. 11A and 11B illustrate a Secondary Defect List (SDL).
Figure 11B:
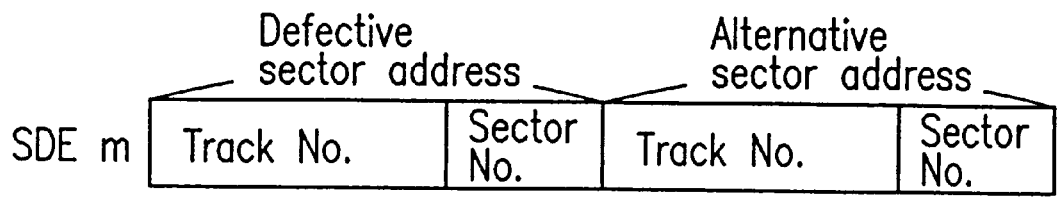
Figure 12:
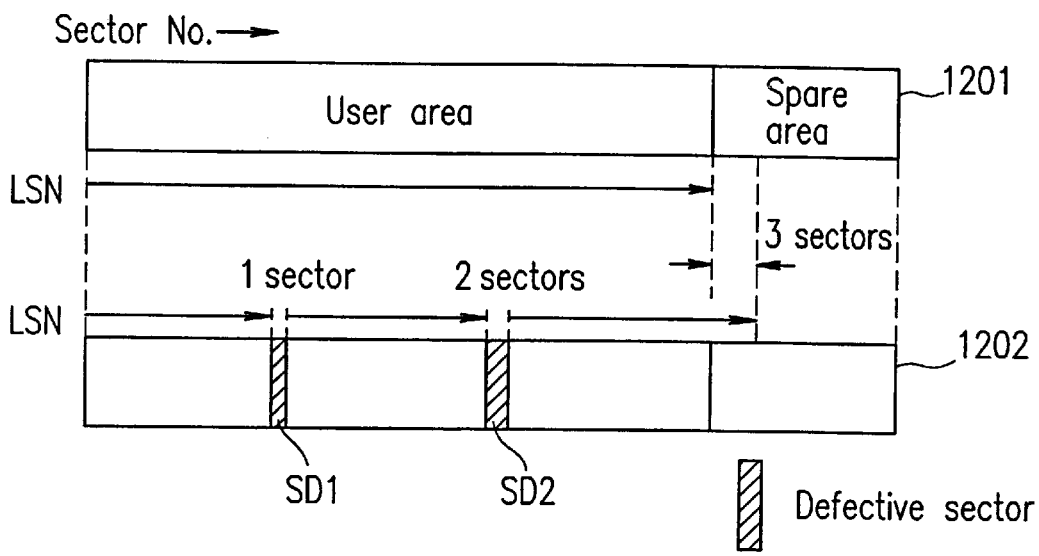
FIG. 12 is a diagram showing defective sectors and alternative sectors to which the Slipping Algorithm is applied.
Figure 13:
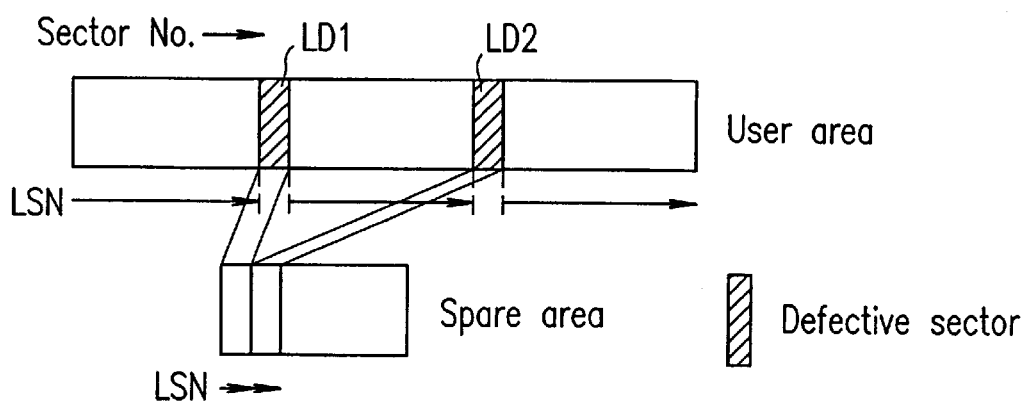
FIG. 13 is a diagram showing defective sectors and alternative sectors to which the Linear Replacement Algorithm is applied.
Figure 14:
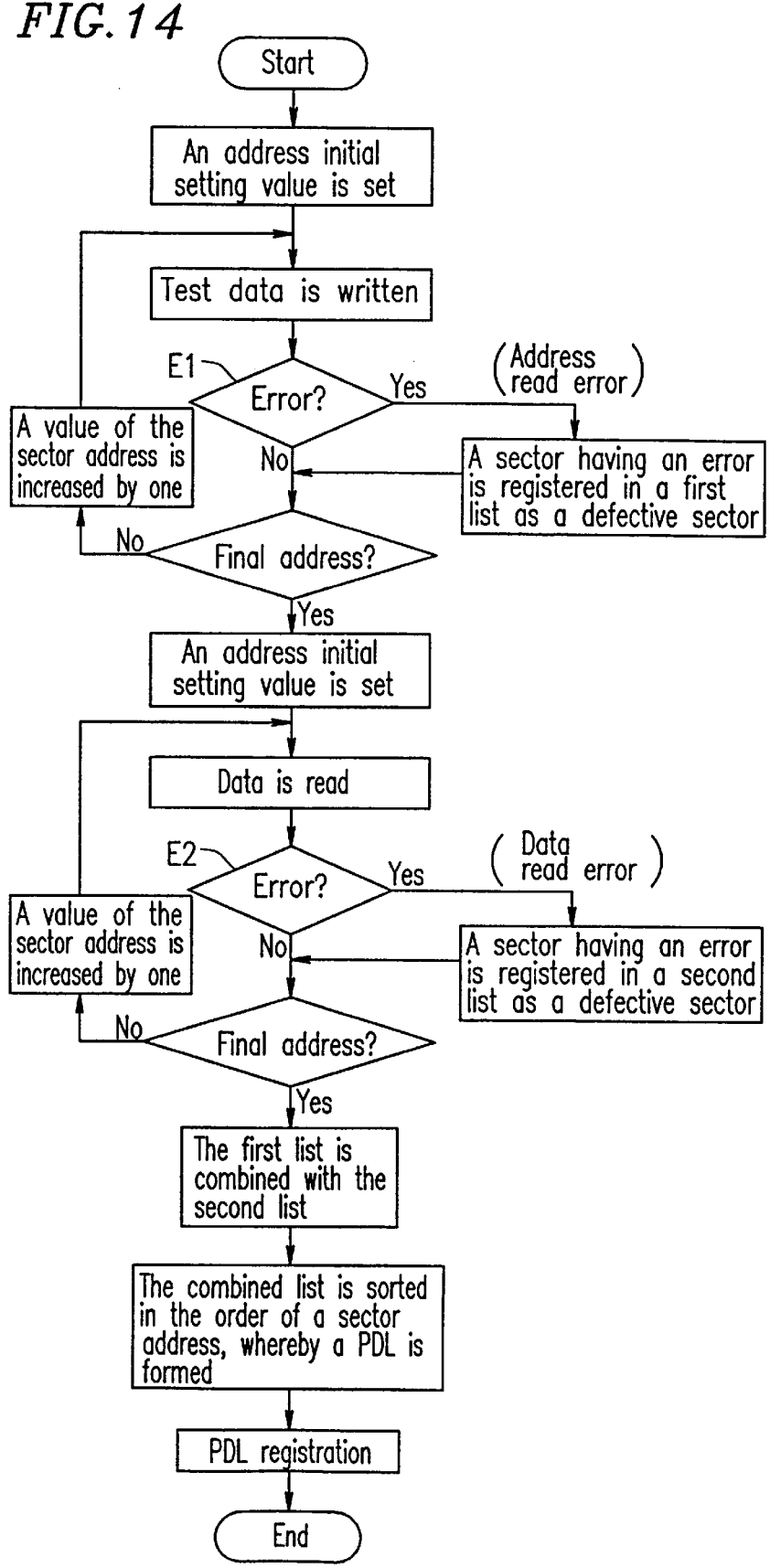
FIG. 14 is a flow chart showing a procedure of disk initialization.
Figure 16:
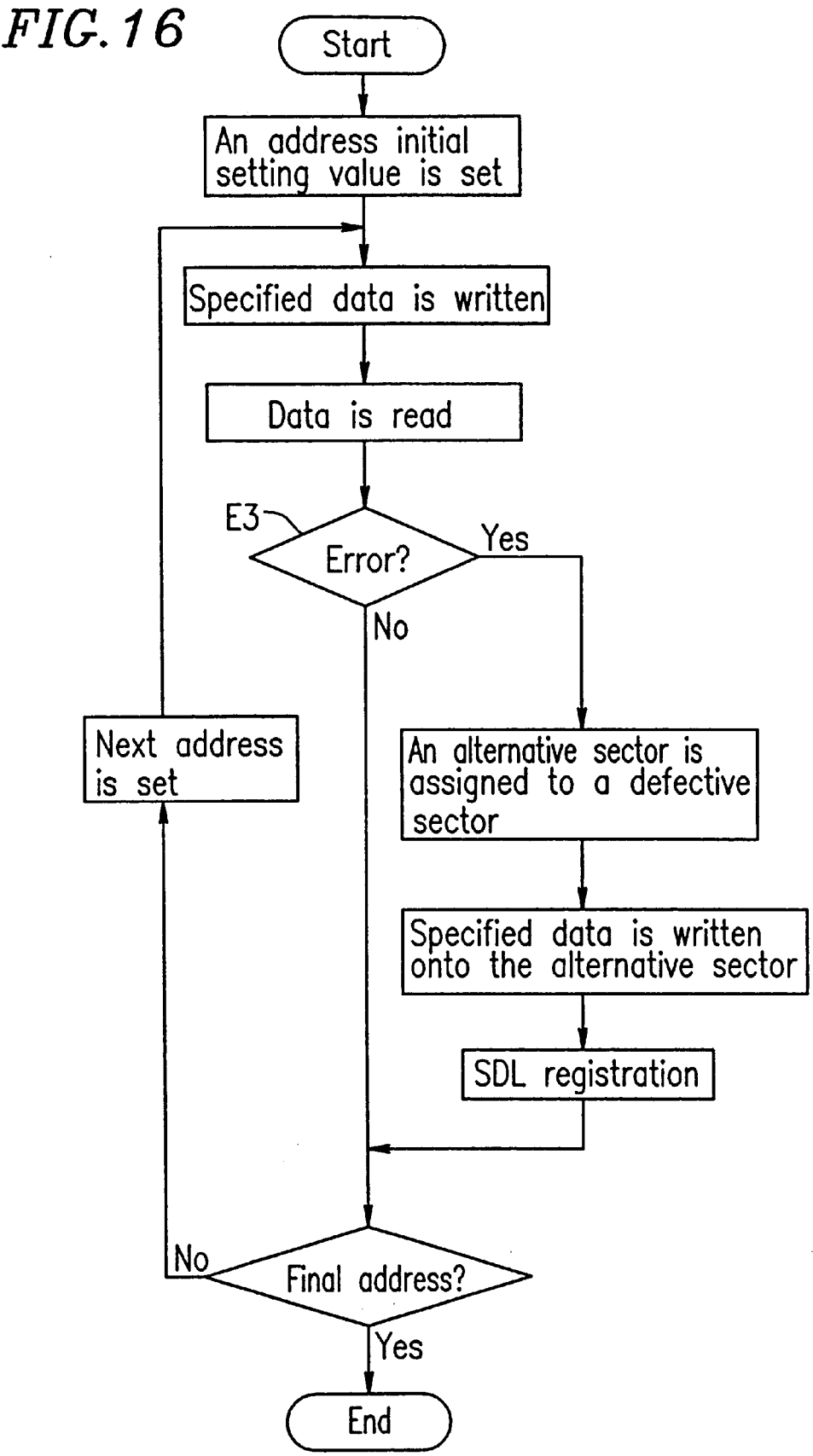
FIG. 16 is a flow chart showing a procedure of recording data onto a disk.
Figure 17A:
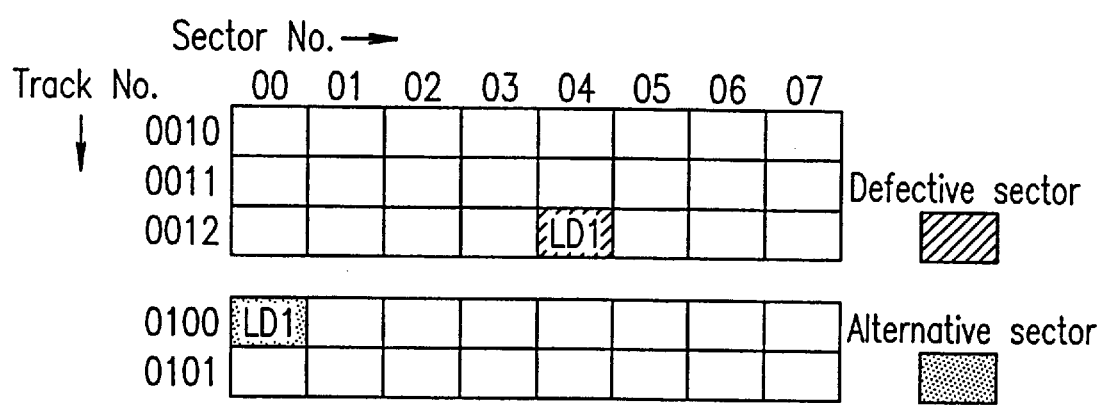
FIGS. 17A and 17B respectively show positions of a defective sector and an alternative sector on a disk medium, and a PDL in which the defective sector and the alternative sector are registered.
Figure 17B:
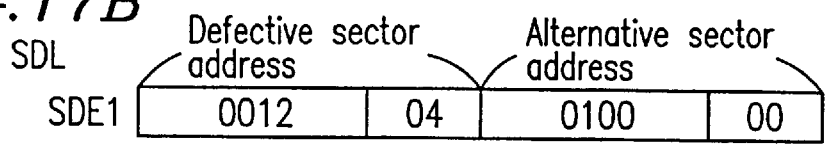
Figure 18A:
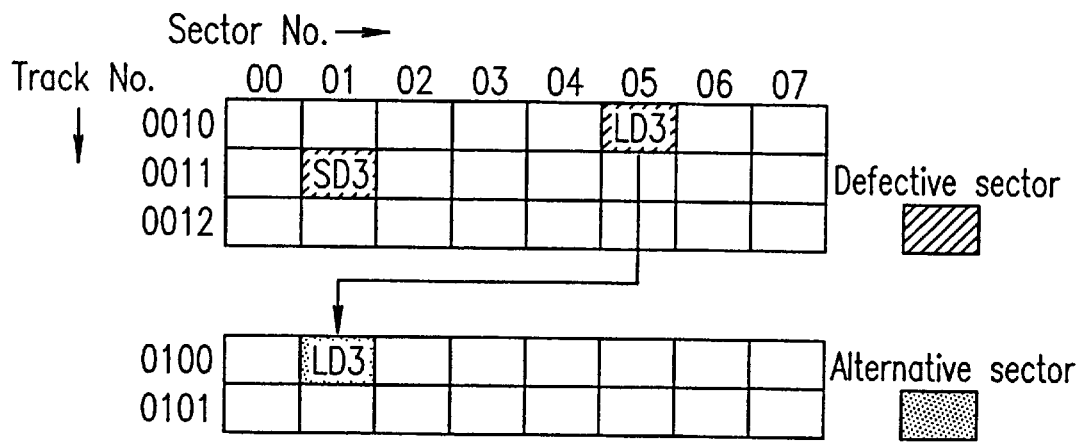
FIG. 18A shows positions of defective sectors and an alternative sector on a disk medium.
Figure 18B:
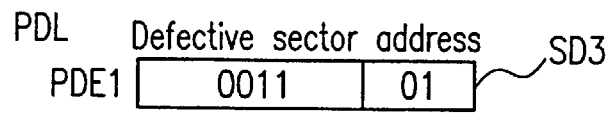
FIG. 18B shows a PDL in which the defective sector is registered.
Figure 18C:
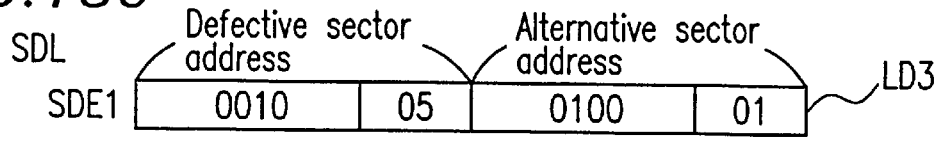
FIG. 18C shows an SDL in which the defective sector and the alternative sector are registered.
Figure 19:
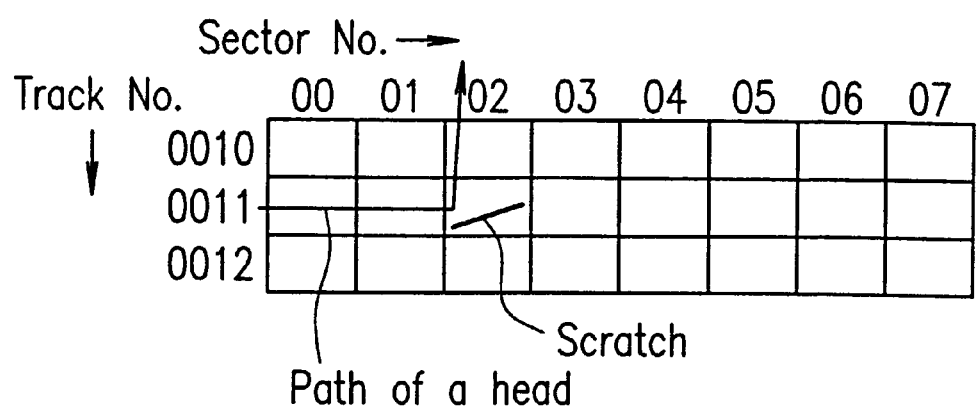
FIG. 19 is a diagram showing access to a defective sector according to a conventional method.
Figure 20:
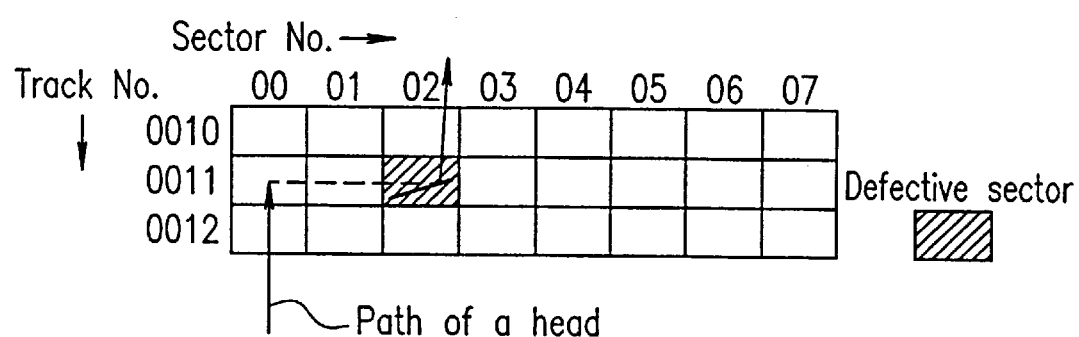
FIG. 20 is a diagram showing access to a defective sector according to the conventional method.

FIG. 9 shows three-stage disk access by using a path of the head 11. Herein, access to an address (track 0011, sector 05) is exemplified. It is assumed that a scratch on the disk extends from the track 0011 to a track 0016. The path of the head 11 is represented by Nos. 1 to 4.

At the first stage of access, the head 11 jumps to a track 0017. At the second stage of access, the head 11 is moved to a track 0014 by the actuator thereof. At the third stage of access, the head 11 jumps to a target sector at an address (track 0011, sector 05).

As described for the two-stage disk access, in the case of the three-stage access, instead of jumping to the desired address (track 0011, sector 05), the head 11 jumps to a sector which is in the same track as the desired address and away from the desired address. In the example shown in FIG. 9, the head 11 jumps to an address (track 0011, sector 04). The operation thereafter and the reason for this are the same as described for the two-stage disk access.

In the above-mentioned example, the two-stage and three-stage disk access have been described. However, by repetition of track jumps, any multi-stage access is made possible.

As described above, according to the multi-stage access in which the head 11 jumps to a neighboring track and then jumps to a target sector, a desired sector can be accessed, completely avoiding a scratch on a disk. Thus, compared with the conventional example in which retries are repeated, a desired sector can be accessed in a remarkably shorter period of time. Furthermore, irrespective of the size of a scratch, highly reliable disk access can be realized.

Embodiment 5

In Embodiment 5, an operation of the disk recording and reproducing apparatus 700 (FIG. 7) described in Embodiment 4 will be described, in which a defective sector is handled by the Slipping Algorithm which utilizes a PDL for initialization of the disk medium 1.

Hereinafter, components of the disk recording and reproducing apparatus 700 (FIG. 7) will be described, which handle a defective sector by the Slipping Algorithm utilizing a PDL for initialization of the disk medium 1. A defective sector is handled in accordance with the procedure described in Embodiment 1, as shown in FIG. 2.

Referring to FIG. 7, initialization of a disk starts when an initialization command is input to the external interface 19 from external control equipment (not shown) such as a host computer.

Referring to the flow chart shown in FIG. 2, the error determination E1 is performed by the drive controller 18 (FIG. 7) based on an address data read error detected by the access controller 14 (FIG. 7) and the error detecting and correcting unit 16 (FIG. 7).

The drive controller 18 (FIG. 7) determines whether or not an error is a tracking error based on a signal output from the servo controller 12 (FIG. 7), which shows whether or not an error is a tracking error, thereby performing the tracking error determination E4.

The error determination E2 is performed by the drive controller 18 (FIG. 7), when an error cannot be corrected by the error detecting and correcting unit 16 (FIG. 7), or when the data read onto the memory 17 (FIG. 7) is different from test data. In the case where it is determined that an error occurs in the error determination E2, the tracking error determination E4 is performed by the drive controller 18 (FIG. 7) based on a signal output from the servo controller 12 (FIG. 7), which shows whether or not an error is a tracking error.

When a defect list is formed, merged, and sorted in the error determination, an area of the memory 17 (FIG. 7) is used. In the final PDL registration, the PDL stored in the memory 17 (FIG. 7) is written onto the disk medium 1 (FIG. 7), and handling of a defective sector by the PDL is completed. The external equipment such as a host computer (not shown) is informed of the completion of this handling through the external interface 19 (FIG. 7).

Thus, even in the case where a defective sector is present due to a tracking error in the disk recording and reproducing apparatus, its operation is not interrupted, and a defective sector can be handled by the Slipping Algorithm utilizing the PDL.

In the operations of the disk recording and reproducing apparatus 700 (FIG. 7) in the present embodiment, the usual recording and reproducing operation with respect to a disk is the same as that described in Embodiment 4.

In the present embodiment, a defective sector is handled by the Slipping Algorithm utilizing the PDL. Thus, when an error occurs in which a track cannot be traced physically due to a scratch of a sector, the defective sector and one subsequent sector are registered in the PDL as defective sectors. As a result, the subsequent sectors of the defective sector can be accessed, and a disk recording and reproducing apparatus which realizes highly reliable disk access can be obtained.

Embodiment 6

In Embodiment 6, an operation will be described, in which the disk recording and reproducing apparatus 700 (FIG. 7) described in Embodiment 4 handles a defective sector by the Linear Replacement Algorithm utilizing an SDL during recording of data onto the disk medium 1.

Hereinafter, components of the disk recording and reproducing apparatus 700 (FIG. 7) will be described, which handle a defective sector by the Linear Replacement Algorithm utilizing an SDL for recording of data onto the disk medium 1. A defective sector is handled in accordance with the procedure described in Embodiment 2 as shown in FIG. 4.

Referring to FIG. 7, recording of data onto a disk starts when a write command requesting record of data is input to the external interface 19 from external control equipment (not shown) such as a host computer. Thereafter, data to be recorded onto the disk medium 1 is input through the external interface 19, and temporarily stored in the memory 17. At this time, an address is also input to the external interface 19.

Referring to the flow chart shown in FIG. 4, the error determination E3 is performed by the drive controller 18 (FIG. 7) when error data which cannot be corrected by the error detecting and correcting unit 16 (FIG. 7) is detected, or when the data read onto the memory 17 (FIG. 7) from the disk medium 1 (FIG. 7) is different from the data temporarily stored in the memory 17 (FIG. 7). The drive controller 18 (FIG. 7) determines whether or not an error detected in the error determination E3 is a tracking error based on a signal output from the servo controller 12 (FIG. 7), which shows whether or not an error is a tracking error, thereby performing the tracking error determination E4.

When data is written onto an alternative sector in the tracking error determination E4, the data temporarily stored in the memory 17 (FIG. 7) is written onto the disk medium 1 (FIG. 7), and the data temporarily stored in the memory 17 is deleted.

The final address is reached, and handling of a defective sector is completed. The external equipment such as a host computer (not shown) is informed of the completion of this handling through the external interface 19 (FIG. 7).

In the operations of the disk recording and reproducing apparatus 700 (FIG. 7) in the present embodiment, the usual recording and reproducing operation with respect to a disk is the same as that described in Embodiment 4.

Thus, even in the case where a defective sector is present due to a tracking error in the disk recording and reproducing apparatus, its operation is not interrupted, and a defective sector can be handled by the Linear Replacement Algorithm utilizing the SDL.

In the present embodiment, a defective sector is handled by the Linear Replacement Algorithm utilizing the SDL. Thus, when an error occurs in which a track cannot be traced physically due to a scratch of a sector, the defective sector and one subsequent sector are registered in the SDL as defective sectors. As a result, the subs equent sectors of the defective sector can be accessed, and a disk recording and reproducing apparatus which realizes highly reliable disk access can be obtained.

Furthermore, there is a possibility that an address read error and a data error occur even during writing of data. Therefore, in the present embodiment, immediately after write of specified data from a leading edge of an addressed sector and immediately after write of specified data onto the alternative sector, as well as immediately after the verifying process, the following process is performed: the error determinations E3 and E4 are performed, and an alternative sector is assigned to a defective sector, followed by SDL registration. Thus, a disk recording and reproducing apparatus which realizes highly reliable disk access can be obtained.

Embodiment 7

In the disk recording and reproducing apparatus 700 (FIG. 7) described in Embodiment 4, a defective sector can be handled by the Slipping Algorithm using a PDL during disk initialization, and after the disk initialization, a defective sector can be handled by the Linear Replacement Algorithm using an SDL. These handlings are realized by applying the procedure described in Embodiment 5 during disk initialization, and applying the procedure described in Embodiment 6 after the disk initialization.

In the present embodiment, the same effects as those described in Embodiments 5 and 6 can be simultaneously obtained. More specifically, in the present embodiment, a defective sector is handled by the combination of the Slipping Algorithm using the PDL and the Linear Replacement Algorithm using the SDL. Thus, when an error occurs in which a track cannot be traced physically due to a scratch of a sector, the defective sector and one subsequent sector are registered in the PDL and the SDL as defective sectors. As a result, the subsequent sectors of the defective sector can be accessed, and a disk recording and reproducing apparatus which realizes highly reliable disk access can be obtained.

Embodiment 8

A disk recording and reproducing apparatus in the present embodiment has the same structure as that of the disk recording and reproducing apparatus 700 described in Embodiment 4 shown in FIG. 7. More specifically, the disk recording and reproducing apparatus 700 includes the motor 10, the head 11, the control unit 30, the modulating and demodulating unit 15, the error detecting and correcting unit 16, the memory 17, the drive controller 18, the external interface 19, and the bus 20. Herein, the control unit 30 includes the servo controller 12, the head controller 13, and the access controller 14.

The data recording and reproducing apparatus 700 in the present embodiment records information onto and reproduces information from a DVD-RAM formatted disk.

In the DVD-RAM formatted disk medium 1 (FIG. 1A), 2,048 bytes of user data is formed as one data sector, and calculation of an ECC is performed with 32,768 bytes (16 data sectors) of user data being one unit. One unit by which the ECC calculation is performed is managed as an ECC block. More specifically, the data recording area 5 (FIG. 1C) is managed under the condition of being divided into an ECC block unit. This DVD-RAM format is described in "120 mm DVD Rewritable Disk (DVD-RAM), Standard ECMA-272" published by ECMA.

The data recording and reproducing apparatus 700 in Embodiment 8 performs usual recording and reproduction of data in the same way as in the data recording and data reproduction described in Embodiment 4. Since the disk medium 1 (FIG. 1A) is DVD-RAM formatted, recording and reproduction of data is performed on an ECC block basis, and an ECC is calculated with respect to each ECC block during recording and reproduction.

The data recording and reproducing apparatus 700 in the present embodiment handles a defective sector by the Slipping Algorithm using the PDL and the Linear Replacement Algorithm using the SDL by performing the same operation as that of the data recording and reproducing apparatus 700 in Embodiment 7. Herein, the same sector address as that in Embodiment 7 is registered in the PDL. A leading sector address in an ECC block including a sector to be registered is registered in the SDL.

More specifically, in the case where a defective sector which is determined to have a tracking error in the tracking error determination E4 (FIG. 4) and the subsequent sector are in the same ECC block, one leading sector address of the ECC block is registered. In the case where the defective sector and the subsequent sector spread across different ECC blocks, leading sector addresses of both the ECC blocks are registered.

As described above, even in the case where data is recorded onto and reproduced from the disk medium 1 in which a recording unit is larger than a physical sector, the same operation as that of the data recording and reproducing apparatus 700 in Embodiment 7 can be performed.

Embodiments 1 through 8 have been described.

In each of the above-mentioned embodiments, the disk medium 1 should have tracks and sectors on a disk. A sector arrangement system is not limited to a CAV (Constant Angular Velocity) system and a CLV (Constant Linear Velocity) system. For example, the present invention is applicable to the CAV system and the CLV system. Furthermore, there are disk media in which the number of sectors is varied depending upon the track. Even in this case, the effect of the present invention can be obtained by the same methods as the above-mentioned disk defect management method and the access method.

In Embodiment 4, each controller is connected through the bus 20. However, as long as a signal and data can be transmitted and received, any connecting method can be used.

In Embodiments 1 through 3, and 5 through 7, in the case where an error is determined to be a tracking error in the tracking determination E4, a sector having a tracking error and one subsequent sector are registered as defective sectors. However, the number of subsequent sectors is not limited to one. Any integer of one or higher can be used. In the case where a tracking error is repeated due to a large scratch, reliability of access to the disk medium 1 (FIG. 1A) can be enhanced by increasing the number of subsequent sectors to higher than one.

In the case where the number of subsequent sectors is prescribed to be N (N is a natural number), in Embodiments 4 through 7 of the present invention, the distance between a target track and a neighboring track to which the head 11 moves in a seeking operation is determined by a distance within a movable range of the actuator of the head 11 and a distance in which the actuator of the head 11 can be moved while the disk medium 1 rotates by N sectors.

In the above-mentioned embodiments, a track number and a sector number of a defective sector address are registered in the PDL and the SDL. However, as long as a sector is specified, a one-dimensional physical sector address may be used.

In FIG. 7, one memory is shown. However, the memory may be divided for each purpose, or the memory may be included in the control unit 30 or in each of the servo controller 12, the head controller 13, and the access controller 14.

According to the present invention, even in the presence of a sector which prevents a track from being traced, a subsequent sector can be accessed without fail. Therefore, highly reliable disk defect management can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for managing a defect of a disk, the disk including a plurality of tracks, each of the plurality of tracks being divided into a plurality of sectors, the method comprising the steps of:

detecting a defective sector which cannot be traced physically among the plurality of sectors; and registering the defective sector and at least one sector following the defective sector in a defect list as defective sectors.

2. A method according to claim 1, further comprising the step of recording data onto an alternative sector which is different from the defective sector registered in the defect list by using a Slipping Algorithm.

3. A method according to claim 1, further comprising the step of recording data onto an alternative sector which is different from the defective sector registered in the defect list by using a Linear Replacement Algorithm.

4. An information recording medium comprising at least one track, each of the at least one track being divided into a plurality of sectors, wherein position information of a defective sector which cannot be traced physically and position information of at least one of the plurality of sectors following the defective sector are recorded so as to be referred to as position information of defective sectors.

5. An information recording medium comprising a plurality of zones, each of the plurality of zones including at least one track, each of the at least one track being divided into a plurality of sectors, wherein a first block with an error correction code calculated is formed across at least two of the plurality of sectors and a second block with an error correction code calculated is formed across at least two of the plurality of sectors, and position information of the first block including a defective sector which cannot be traced physically among the plurality of sectors and position information of the second block including at least one of the plurality of sectors following the defective sector are recorded so as to be referred to as position information of defective blocks.

6. A method for managing a defect of a disk, the disk including a plurality of zones, each of the plurality of zones including a plurality of tracks, each of the plurality of tracks being divided into a plurality of sectors, blocks each having an error correction code calculated being formed across at least two of the plurality of sectors, the method comprising the steps of:

detecting a defective sector which cannot be traced physically among the plurality of sectors; and registering a first one of the blocks including the defective sector and a second one of the blocks including at least one of the plurality of sectors following the defective sector as defective sectors.

* * * * *